(12) United States Patent
Amini et al.

(10) Patent No.: US 11,083,075 B2
(45) Date of Patent: Aug. 3, 2021

(54) SHED-RESISTANT THERMAL ATOM SOURCE

(71) Applicants: IonQ, Inc., College Park, MD (US); University of Maryland, College Park, College Park, MD (US)

(72) Inventors: Jason Madjdi Amini, Takoma Park, MD (US); Jonathan Mizrahi, Silver Spring, MD (US); Kai Hudek, Hyattsville, MD (US); Marko Cetina, College Park, MD (US)

(73) Assignees: IonQ, Inc., College Park, MD (US); University of Maryland, College Park, College Park, MD (US)

( * ) Notice: Subject to any disclaimer, the term of this patent is extended or adjusted under 35 U.S.C. 154(b) by 0 days.

(21) Appl. No.: 16/242,431

(22) Filed: Jan. 8, 2019

(65) Prior Publication Data
US 2019/0215945 A1 Jul. 11, 2019

Related U.S. Application Data

(60) Provisional application No. 62/616,049, filed on Jan. 11, 2018.

(51) Int. Cl.
*H05H 3/02* (2006.01)
*H01J 27/02* (2006.01)
*G06N 10/00* (2019.01)

(52) U.S. Cl.
CPC ............... *H05H 3/02* (2013.01); *G06N 10/00* (2019.01); *H01J 27/022* (2013.01)

(58) Field of Classification Search
None
See application file for complete search history.

(56) References Cited

U.S. PATENT DOCUMENTS 4,783,595 A * 11/1988 Seidl ................... H01J 27/26
250/423 R
5,654,541 A * 8/1997 Outlaw .................... H05H 3/02
250/251

OTHER PUBLICATIONS https://web.archive.org/web/20171113044544/https://m.wikihow.com/Make-a-Potato-Gun (Year: 2017).*
https://web.archive.org/web/20131231092351/https://makezine.com/projects/make-03/see-thru-potato-cannon/ (Year: 2013).*
(Continued)

*Primary Examiner* — James Choi
(74) *Attorney, Agent, or Firm* — Arent Fox LLP

(57) ABSTRACT

The disclosure describes various aspects of a shed-resistant thermal atom source. More specifically, a thermal atom source is described for uniform thermal flux of target atomic species in which a metal wadding material is used as an intermediary surface for sublimation of the atoms, preventing the source material from shedding or dropping. In an aspect, a thermal atom source may include a container with closed and open ends, and inside a source material near the closed end and a wadding between the source material and the open end; a heater coupled to the closed end; one or more clamps configured to secure the container and the heater; and a current source coupled to the container and the heater to cause a temperature to increase such that a portion of the source material is released and diffuses to the open end through the wadding prior to being emitted as a flux.

24 Claims, 9 Drawing Sheets

(56) References Cited

OTHER PUBLICATIONS https://web.archive.org/web/20040208123606/http://www.angelfire.com/80s/sixmhz/coolstuff.html (Year: 2004).*
Hatch et al., Photoinduced Pathways to Dissociation and Desorption of Dioxygen on Ag(110) and Pt(111), 95 J. Phys. Chem. 1759-1768 (1991) (Year: 1991).*

* cited by examiner

SHED-RESISTANT THERMAL ATOM SOURCE

CROSS REFERENCE TO RELATED APPLICATIONS

The present application claims priority to and the benefit of U.S. Provisional Patent Application No. 62/616,049, entitled "SHED-RESISTANT THERMAL ATOM SOURCE," and filed on Jan. 11, 2018, the contents of which are incorporated herein by reference in their entirety.

BACKGROUND OF THE DISCLOSURE

Aspects of the present disclosure generally relate to atomic systems, and more specifically, to a shed-resistant thermal atom source used in such systems.

Individual optically-active quantum systems such as trapped atoms are one of the leading implementations for quantum information processing. Other implementations may include superconducting circuits. Atomic-based qubits can be used as quantum memories, can host quantum gates in quantum computers and simulators, and can act as nodes for quantum communication networks. Qubits based on trapped atomic ions enjoy a rare combination of attributes. For example, qubits based on trapped atomic ions have very good coherence properties, can be prepared and measured with nearly 100% efficiency, and are readily entangled with each other by modulating their Coulomb interaction or remote photonic interconnects. Lattice of cold (e.g., laser-cooled) trapped atoms have also proven useful for precision metrology, including sensors of small forces and atomic clocks.

To produce the atomic ions for quantum information processing (QIP) systems based on trapped ion technology, or for other neutral and ion systems such as clocks or sensors, sources of atomic species are used. These sources, however, may have limitations in the way they are oriented since material used as the source of atoms can shed or fall out, disrupting operations and/or causing particulates to contaminate various parts of the system. Accordingly, sources of atoms for QIP systems or other atomic systems that prevent source material from shedding or dropping are desirable.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In an aspect of the disclosure, various techniques are described for a shed-resistant thermal atom source, also referred to as an atomic oven source or simply as an oven. The thermal atom source described in this disclosure is configured to provide a directed thermal flux of a target atomic species by using a metal wadding material as an intermediary surface for sublimation of the atoms, preventing the source material from shedding/dropping.

For example, a thermal atom source for atomic systems (e.g., QIP systems, clocks. sensors) is described that includes a container (e.g., a cylindrical tube) with a closed end and an open end, where the container has positioned inside a source material near the closed end and a wadding between the source material and the open end of the container. The thermal atom source may also include a heater (e.g., a filament) coupled to the closed end of the container, one or more clamps configured to secure the container and the heater, and a current source coupled to the container and the heater to cause a temperature of the container and the heater to increase, which in turn causes at least a portion of the source material to be released and diffuse to the open end of the container through the wadding prior to being emitted as a flux from the open end of the container.

In another example, a method for operating a thermal atom source for an atomic system is described that includes, configuring the thermal atom source for operation, the thermal atom source including a container with a closed end and an open end, where the container has positioned inside a source material near the closed end and a wadding between the source material and the open end of the container, a heater coupled to the closed end of the container, one or more clamps configured to secure the container and the heater, and a current source coupled to the container and the heater to cause a temperature of the container and the heater to increase, which in turn causes at least a portion of the source material to be released and diffuse to the open end of the container through the wadding prior to being emitted as a flux from the open end of the container. The method may also include applying, through the current source, a current to the container and the heater to produce a thermal profile that causes the temperature increase in the container and the heater, and providing the emitted flux from the open end of the container to an ion trap of the atomic system to confine one or more atomic ions for quantum bits.

In another example, a thermal atom source for atomic systems is described that includes a container with a closed end and an open end, the container having inside a source material near the closed end and a wadding between the source material and the open end of the container, a heater or heating means configured to provide radiation heating and positioned near the container; and one or more clamps configured to secure the container, wherein the radiation heating provided by the heater causes a temperature of the container to increase, which in turn causes at least a portion of the source material to be released and diffuse to the open end of the container through the wadding prior to being emitted as a flux from the open end of the container.

Each of the aspects described above can also be implemented using means for performing the various functions described in connection with those aspects.

BRIEF DESCRIPTION OF THE DRAWINGS

The appended drawings illustrate only some implementation and are therefore not to be considered limiting of scope.

DETAILED DESCRIPTION

Figure 1A:
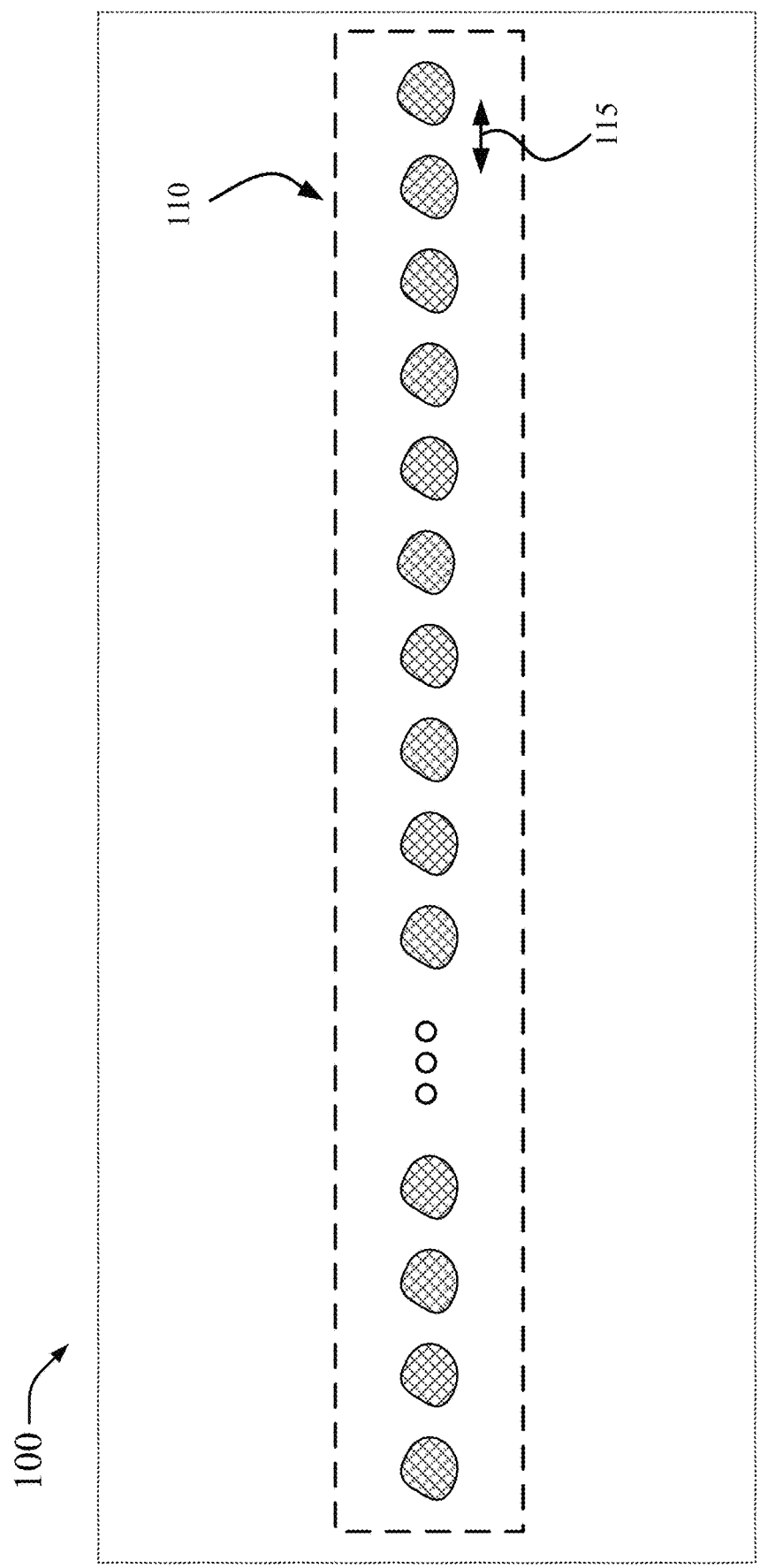
FIG. 1A illustrates a view of a vacuum chamber that houses electrodes for the trapping of atomic ions a linear lattice in accordance with aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

As described above, trapped atoms may be used to implement quantum information processing. Atomic-based qubits can be used as different type of devices, including but not limited to quantum memories, the host of quantum gates in quantum computers and simulators, and nodes for quantum communication networks. Qubits based on trapped atomic ions (e.g., atoms with a net state of electrical charge) can have very good coherence properties, can be prepared and measured with nearly 100% efficiency, and can be readily entangled with each other by modulating their Coulomb interaction or remote photonic interconnects. Lattices of cold (e.g., laser-cooled) trapped atoms have also proven useful for precision metrology, including sensors of small forces and atomic clocks. As used in this disclosure, the terms "atoms," "atomic ions," and "ions" may be used interchangeably to describe the particles that are isolated and controlled, to be confined, or are actually confined, in a trap individually or as multiples with the latter forming a diffuse cloud, a crystal lattice or similar arrangement or configuration. Where the charge state of the atom (neutral atom or any charge state of the atomic ion) is not relevant, the disclosure describes techniques that can be used for any type of neutral atom or atomic ion or other type of optically active quantum system. More specifically, this disclosure describes techniques for a shed-resistant thermal atom source used in atomic systems such as QIP systems, clocks, or sensors.

In the case of atomic ions, the typical ion trap geometry or structure used for quantum information and metrology purposes is the linear radio-frequency (RF) Paul trap (also referred to as an RF trap or simply a Paul trap), where nearby electrodes hold static and dynamic electrical potentials that lead to an effective inhomogeneous harmonic confinement of the ions. The RF Paul trap is a type of trap that uses electric fields to trap or confine one or more charged particles in a particular region, position, or location. When multiple atomic ions are loaded into such a trap and are laser-cooled to very low temperatures, the atomic ions form a stationary lattice of qubits (e.g., a structured arrangement of qubits), with Coulomb repulsion balancing the external confinement force. For sufficient trap anisotropy, the ions can form a linear lattice along the weak direction of confinement, and this is the arrangement typically employed for applications in quantum information and metrology. As the trap anisotropy is reduced, the atomic ions undergo a series of phase transitions in their static conformation in space, evolving to a two-dimensional (2D) zig-zag or jagged type structure, then a three-dimensional (3D) helical structure, ultimately toward a spherical lattice when the three directions of confinement approach isotropy.

FIG. 1A illustrates a partial view of a vacuum chamber 100 that houses electrodes for the trapping of atomic ions in a linear lattice or crystal 110 using a linear RF Paul trap. In the example shown in FIG. 1A, a vacuum chamber in a quantum system includes electrodes for trapping one or more atomic Ytterbium ions (e.g., $^{171}Yb^+$ ions) which are confined in the linear lattice 110 and are laser-cooled to be nearly at rest. While multiple atomic ions are shown in this example, the number of atomic ions trapped can be configurable and more or fewer than the number of atomic ions shown may be trapped including, but not limited to, the configuration with a single ion being trapped. The atoms are illuminated with laser radiation tuned to a resonance in $^{171}Yb^+$ and the fluorescence of the atomic ions is imaged onto a camera. In this example, atomic ions are separated by distance 115 of about 5 microns (μm) from each other as shown by fluorescence. The separation of the atomic ions is determined by a balance between the external confinement force and Coulomb repulsion.

Atomic ions are typically loaded into traps by creating a neutral atomic flux of the desired particle, and ionizing them once in the trapping volume. Ions can remain confined for months, with lifetimes often limited by the level of vacuum.

Figure 1B:
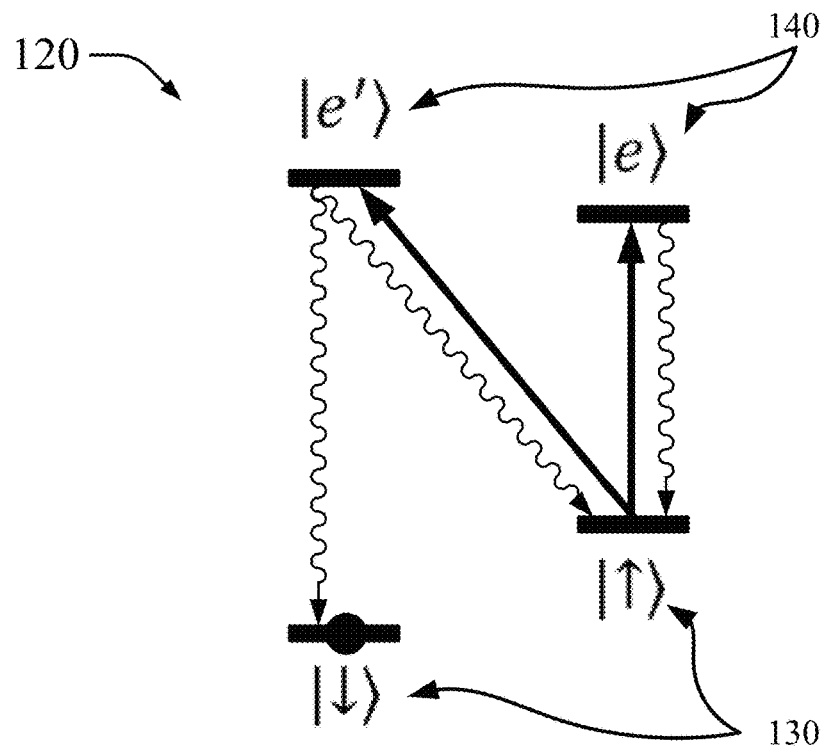
FIG. 1B is a diagram illustrating an example of a simplified energy level diagram showing the application of laser radiation for state initialization in accordance with aspects of the disclosure.
Figure 1C:
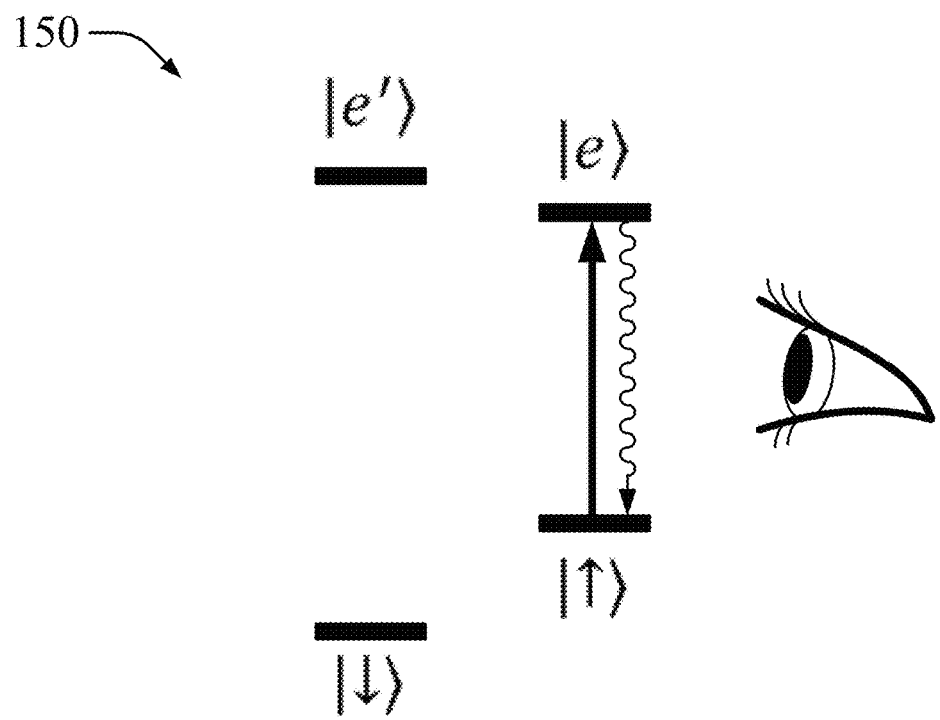
FIG. 1C is a diagram illustrating an example of a simplified energy level diagram showing the application of laser radiation for qubit state detection through fluorescence in accordance with aspects of the disclosure.

FIG. 1B and FIG. 1C show the reduced energy level diagrams 120 and 150, respectively, for an example species of atomic ion $^{171}Yb^+$ where the two states of the quantum bits (qubits) $|\uparrow\rangle$ and $|\downarrow\rangle$ 130 are represented by the stable hyperfine levels in the ground electronic state, and are separated approximately by frequency $\omega_0/2\pi$=12.642 GHz. The excited electronic states $|e\rangle$ and $|e'\rangle$ 140 in $^{171}Yb^+$ are themselves split by a smaller hyperfine coupling and are separated from the ground states by an optical interval having an energy corresponding to an optical wavelength of 369.53 nm.

In FIGS. 1B and 1C, all allowed transitions from the excited electronic states $|e\rangle$ and $|e'\rangle$ 140 are illustrated as downward, wavy arrows. On the other hand, the applied laser radiation (which is shown as upward, straight arrows) drive these transitions for initialization to state $|\downarrow\rangle$ as shown in FIG. 1B, and for fluorescence detection of the qubit state ($|\uparrow\rangle$=fluorescence, $|\downarrow\rangle$=no fluorescence) as shown in FIG. 1C.

Laser radiation tuned just below resonance in these optical transitions allows for Doppler laser cooling to confine the atomic ions near the bottom of the trapping potential. Other more sophisticated forms of laser cooling can bring the atomic ions to be nearly at rest in the trap.

Figure 2:
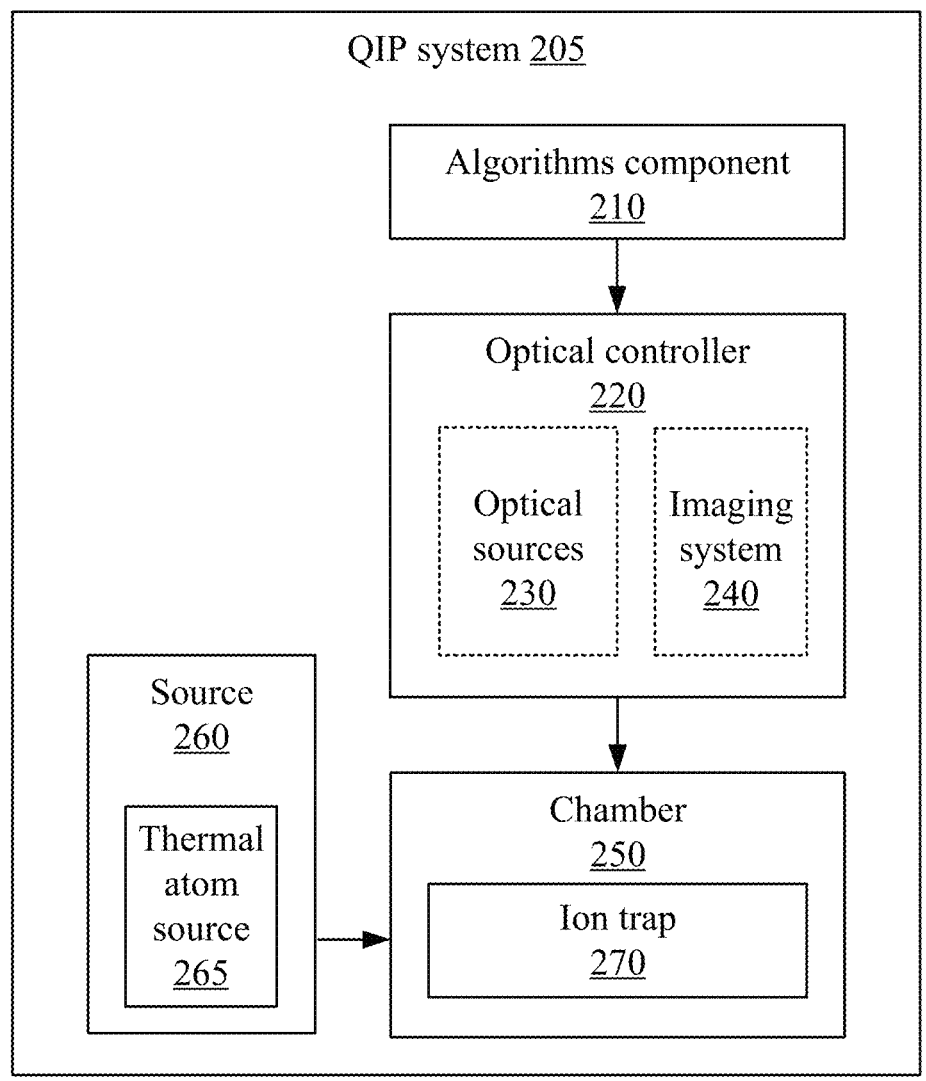
FIG. 2 is a block diagram that illustrates an example of a quantum information processing (QIP) system in accordance with aspects of this disclosure.

FIG. 2 is a block diagram that illustrates an example of a QIP system 205 in accordance with aspects of this disclosure. The QIP system 205 may also be referred to as a quantum computing system, a computer device, or the like. In an aspect, the QIP system 205 may correspond to portions of a quantum computer implementation of the computing device 500 in FIG. 5.

The QIP system 205 can include a source 260 that provides atomic species (e.g., a flux of neutral atoms) to a chamber 250 (see e.g., the vacuum chamber 100 in FIG. 1A) having an ion trap 270 that traps the atomic species once ionized (e.g., photoionized) by an optical controller 220. The source 260 can include a thermal atom source or atomic oven source 265, details of which are provided below in connection with FIGS. 3A-3D. The source 260 is shown outside the chamber 250, however, in some implementations it can be inside the chamber 250. Optical sources 230 in the optical controller 220 may include one or more laser sources that can be used for ionization of the atomic species, control (e.g., quantum state control) of the atomic ions, and for fluorescence of the atomic ions that can be monitored and tracked by image processing algorithms operating in an imaging system 240 in the optical controller 220. The imaging system 240 can include a high resolution imager (e.g., CCD camera) for monitoring the atomic ions while they are being provided to the ion trap 270 (e.g., for counting) or after they have been provided to the ion trap 270 (e.g., for monitoring the atomic ions states). In an aspect, the imaging system 240 can be implemented separate from the optical controller 220; however, the use of fluorescence to detect, identify, and label atomic ions using image processing algorithms may need to be coordinated with the optical controller 220.

Although not shown, one or more radio-frequency (RF) amplifiers may be used to provide RF potential to the ion trap 270 for operation.

The QIP system 205 may also include an algorithms component 210 that may operate with other parts of the QIP system 205 (not shown) to perform quantum algorithms or quantum operations. As such, the algorithms component 210 may provide instructions to various components of the QIP system 205 (e.g., to the optical controller 220) to enable the implementation of the quantum algorithms or quantum operations.

Figure 3A:
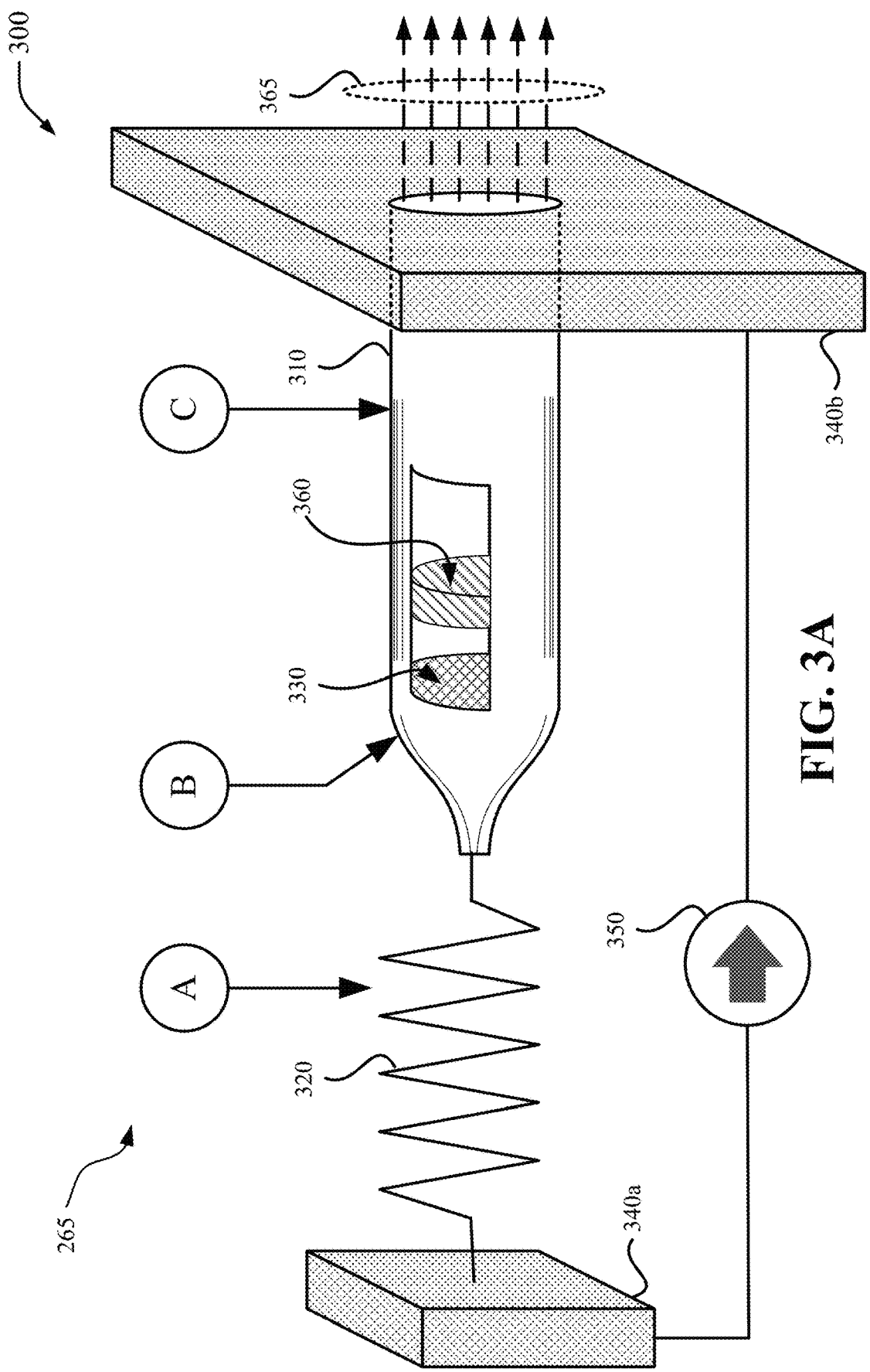
FIG. 3A is a diagram that illustrates a perspective view of an example of a thermal atom source in accordance with aspects of this disclosure.

FIG. 3A shows a diagram 300 that illustrates a perspective view of the thermal atom source 265 in FIG. 2 in accordance with aspects of this disclosure. The thermal atom source 265 is configured to be resistant to shedding or dropping material when used in different orientations (e.g., when inverted). The thermal atom source 265 may include a container or tube 310 that has an open end and a closed end, a heater filament 320, a source of solid material 330 (referred to as a source or source material) to be emitted as a thermal beam or oven flux 365, one or more clamps 340 to secure the container 310 and the heater filament 320, and a metal wadding 360 (also referred to as a plug or simply a wadding) that prevents the source 330 or any byproducts from falling out of or being shed by the thermal atom source 265 when in certain orientations (e.g., when inverted). In the example shown in the diagram 300, the container 310 has a uniform cylindrical shape, although other shapes may also be used to obtain a desirable thermal profile. Also, the clamps 340 in this example include a first clamp 340a used to secure at least one end of the heater filament 320, and a second clamp 340b used to secure at least one end (e.g., the open end) of the container 310. In this example, the second clamp 340b may include an opening through which the thermal beam 365 is emitted, where the opening may be configured to match the open end of the container 310. The thermal atom source 265 may also include a current source 350 that provides a current to heat the heater filament 320 and/or the container 310. All the components of the thermal atom source 265 may be compatible with ultra-high vacuum (UHV), allowing operation without compromising vacuum.

In an aspect, the source 330 is typically loaded or placed within the container 310 near the closed end of the container 310. The wadding 360 is also placed within the container 310 and is packed in front of the source 330. That is, the wadding 360 is placed between the source 330 and the open end of the container 310. The wadding 360 can be made of a compressed, tangled ball of thin wire. The wadding 360 is configured to provide a barrier that prevents the source 330, portions of the source 330, or byproducts from heating the source 330, from passing through the wadding 360. In an example, the wadding 360 may allow some material to diffuse through but not allow particulates (e.g., oxide layers) to diffuse and may also stop the source 330 from falling out of the container 310. When, for example, current from the current source 350 is passed through the heater filament 320 and the container 310, a temperature of the heater filament 320 and of the container 310 increases as they are both heated or warmed up, which in turn causes the source 330 and the wadding 360 to heat. In an aspect, because of the heating, the source 330 sublimates (e.g., solid turns into a gas) or melts and evaporates, coating the wadding 360 in the source material. The compressed wire of the wadding 360 then provides a circuitous path for the source material to diffuse to near the open end of the container 310 (close to the clamp 340b), after which it is emitted by the thermal atom source 265 into the thermal beam 365. In some implementations, one or more additional waddings 360 may be placed between the wadding 360 and the open end of the container 310. The wadding and the one or more additional waddings 360 can have the same composition or different composition and/or the same structure or different structures.

Thermal modeling of the thermal atom source 265 allows for appropriate implementation and/or selection of the dimensions and/or materials for the container 310 and/or the heater filament 320 to create the appropriate thermal profile along the thermal atom source 265 with the maximum temperature at "B" in the diagram 300, by the closed end of the container 310 near the source 330. If the maximum temperature is instead configured to take place at "A" (e.g., near the heater filament 320) or "C" e.g., near a middle portion of the container 310 and after the location of the wadding 360), then the operation of the thermal atom source 265 may be power inefficient, leading to hotter temperatures of surrounding materials, affecting vacuum pressure due to outgassing. Therefore, the container 310 and the heater filament 320 (or any other form of heating provided) are configured to produce a temperature maximum near a middle of the container 310, closer to the open end of the container 310 that a location of the wadding 360, or configured to produce a temperature maximum at another desired location on the heater filament 320 or the container 310. Selection of the dimensions and/or materials for the container 310 and/or the heater filament 320 may also affect the time profile of the heating/cooling of the thermal atom source 265 when power is applied/disconnected. The time profile can be tuned for efficient operation via time-dependent thermal modelling.

In an aspect of this disclosure, the wadding 360 can be made of, for example, platinum wire or shavings, or similar electro-negative metal, so that the emitted flux (e.g., the thermal beam 365) is positively charged. The wadding 360 may be a sintered metal or ceramic plug that provides a circuitous path for the source materials to diffuse through.

The wadding 360 may be made of a compressed metal wire or other porous material such as sintered metal or sintered ceramic.

In an aspect of this disclosure, the source 330 may be made by loading two or more elements or compounds near the closed end of the container 310. During heating, the elements or components react or amalgamate, and coat the wadding 360 as a result. Further heating then causes the product to be emitted instead of the reactants.

In the example shown in the diagram 300, the heater filament 320 is shown as having a certain shape (e.g., having a shaped configuration). One possible shape is a helical or coil-like shape. The heater filament 320 can, however, be straight (e.g., having a straight configuration) or can be an arbitrary shape as required by the particular application.

In another aspect of this disclosure, the clamps 340 (e.g., clamps 340a and 340b) for the heater filament 320 and the container 310 could be connected by an insulator to make a plug-in device.

A different embodiment of the thermal atom source 265 may use instead of the heater filament 320 a different type of heating element that is not heated with direct Joule heating (e.g., Ohmic or resistive heating through the heater filament 320), but provides heating through an indirect means, such as radiation heating, for example.

Figure 3B:
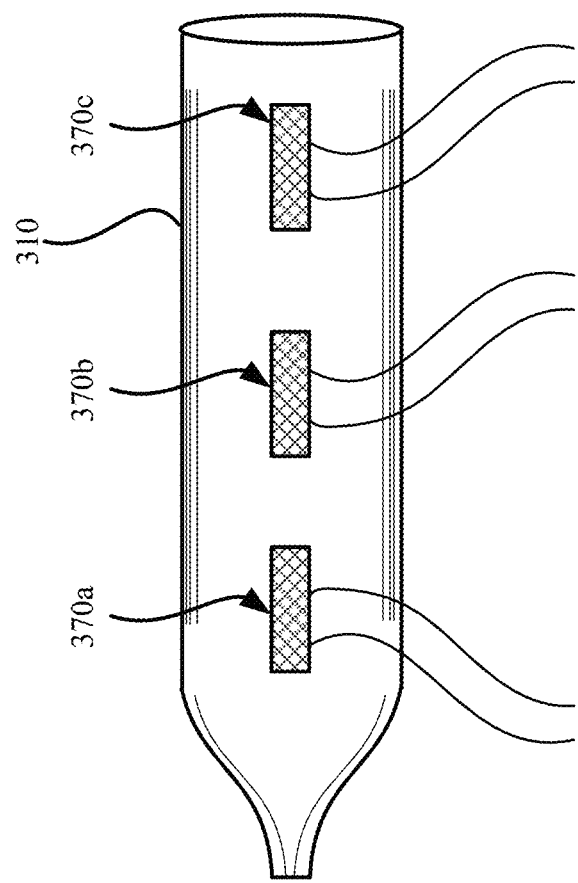
FIG. 3B is a diagram that illustrates an example of using thermocouples in a thermal atom source in accordance with aspects of this disclosure.

In yet another aspect of this disclosure, and as shown in a diagram 303 in FIG. 3B, thermocouples 370a, . . . , 370c may be added to the container 310 to monitor temperature at different positions. In some implementations, more or fewer thermocouples than those shown in the diagram 303 may be used. Moreover, the thermocouples that are used to monitor temperature may be placed at different locations on an outer portion of the container 310, where the locations may be selected to monitor a particular thermal profile of the container 310.

In the example shown in the diagram 300, the container 310 is shown as having a straight cylindrical shape (e.g., having a straight configuration). The container 310, however, can be bent or can even have a 180 degree shape to create a multi-stage device (e.g., heat end to prime, heat middle to run). When bent, the container 310 may be said to have a shaped configuration. In some instances, one or both of the heater filament 320 and the container 310 can have a shaped configuration (e.g., are not straight).

In an aspect of this disclosure, rather than heating up the container 310 using a heater filament 320, the container 310 may be heated by a different means or type of device, such as by using a laser, for example.

As described above, it is possible to select the dimensions and/or materials for the container 310 and the heater filament 320 such that they are tuned to produce a heating profile that results in a maximum temperature at "C." In this case material emitted from the source 330 and the wadding 360 that hits the inner walls of the container 310 before reaching the point "C" will reemit, possibly improving the efficiency of the thermal atom source 265 in emitting the source 330 at the cost of a larger emission angle (e.g., a larger angular spread of the thermal beam 365).

Figure 3C:
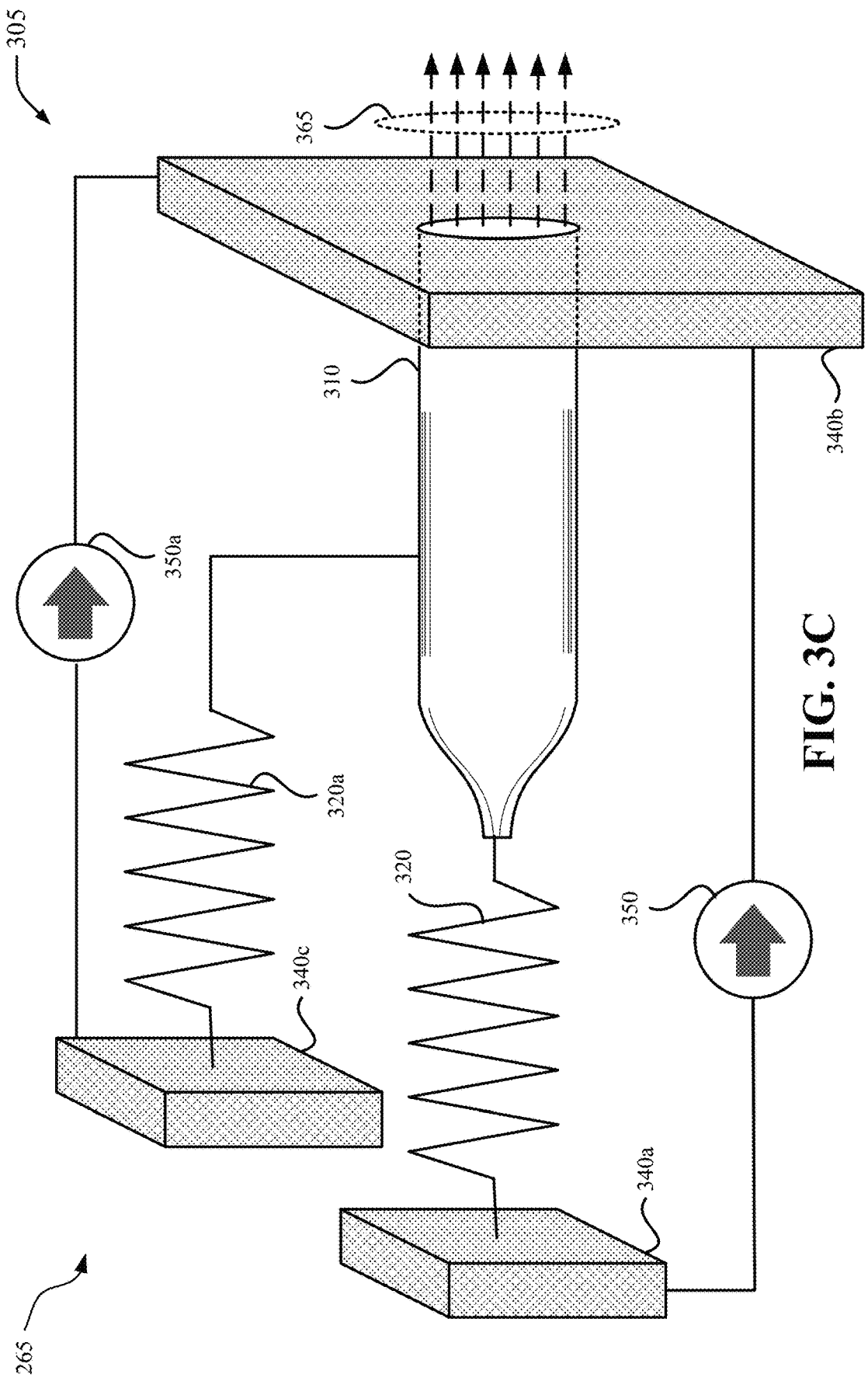
FIG. 3C is a diagram that illustrates an example of using additional heater filaments in a thermal atom source in accordance with aspects of this disclosure.

FIG. 3C shows a diagram 305 illustrating a different implementation of the thermal atom source 265 in which at least one additional heater filaments 320a may be attached or coupled to the container 310 along its length to create a user controllable thermal profile. A clamp 340c is used to secure the heater filament 320a and the thermal source 265 also includes an additional current source 350a that provides a current to heat the heater filament 320a and/or the container 310. In this case, in addition to identifying a proper placement of the additional heater filaments, current provided to each additional heating filament may be controlled to produce the desired thermal profile. In some implementations, the number of additional heater filaments may be different than those shown in the diagram 305.

Figure 3D:
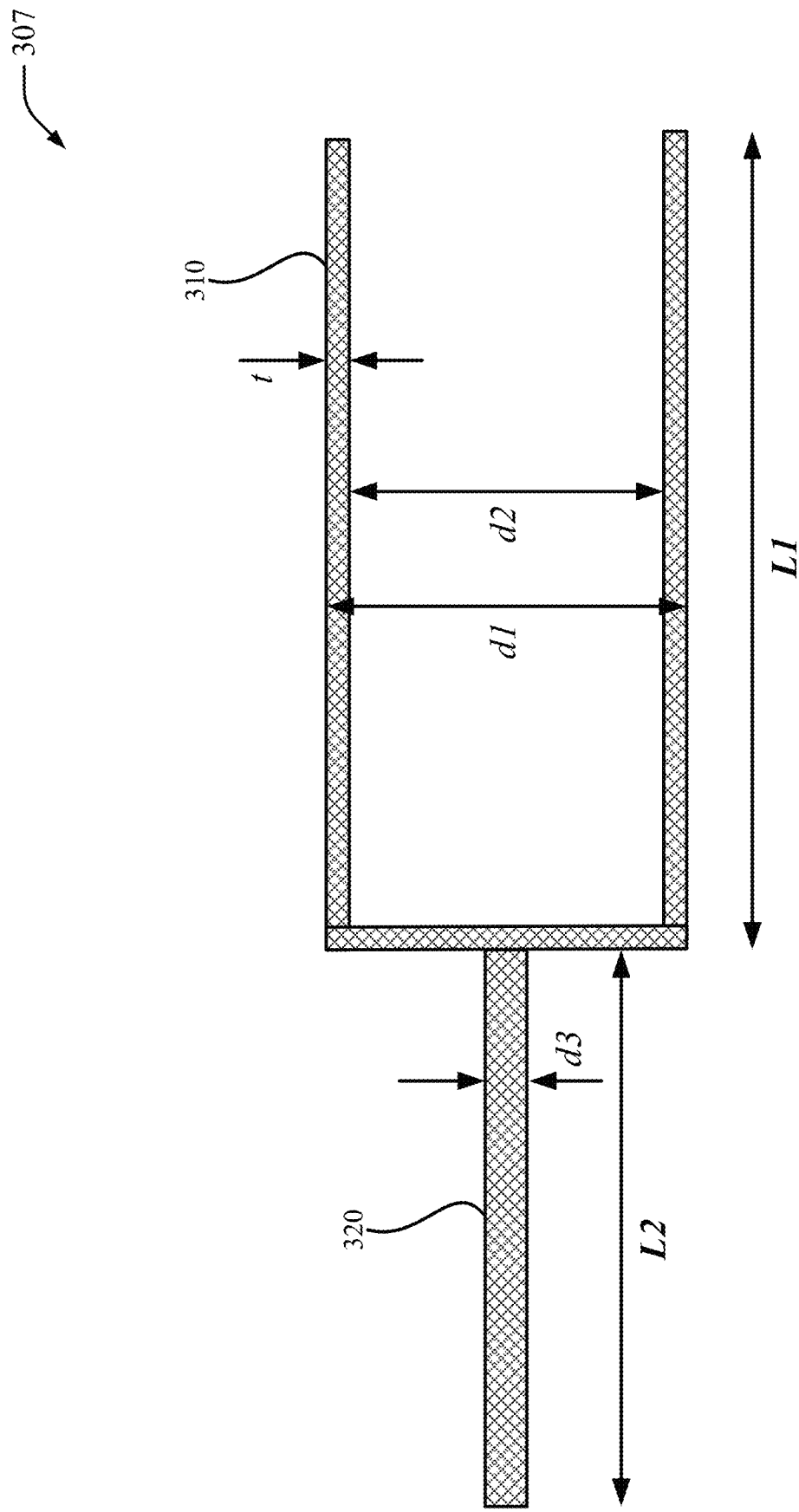
FIG. 3D is a diagram that illustrates an example of creating a thermal profile by varying dimensions of a container and/or a heater in a thermal atom source in accordance with aspects of this disclosure.

Referring to FIG. 3D, a diagram 307 is shown that provides an example of creating a thermal profile by varying dimensions of the container 310 and the heater filament 320 in the thermal atom source 265. As shown in the diagram 307, a wall thickness (t) of the container 310, an outside diameter (d1) of the container 310, an inside diameter (d2) of the container 310, a material of the container 310, a diameter (d3) of the heater filament 320 and of any additional heating filaments such as 320a, a material of the heater filament 320 and of any additional heating filaments such as 320a, or a combination of any of these parameters, may be varied along a length (L1) of the container 310 and/or a length (L2) of the heater filament 320 to create a desirable thermal profile.

The features described in FIGS. 3B, 3C, and 3D may be implemented independent from each other in the thermal atom source 265 or may be implemented in some combination in the thermal atom source 265.

Figure 4:
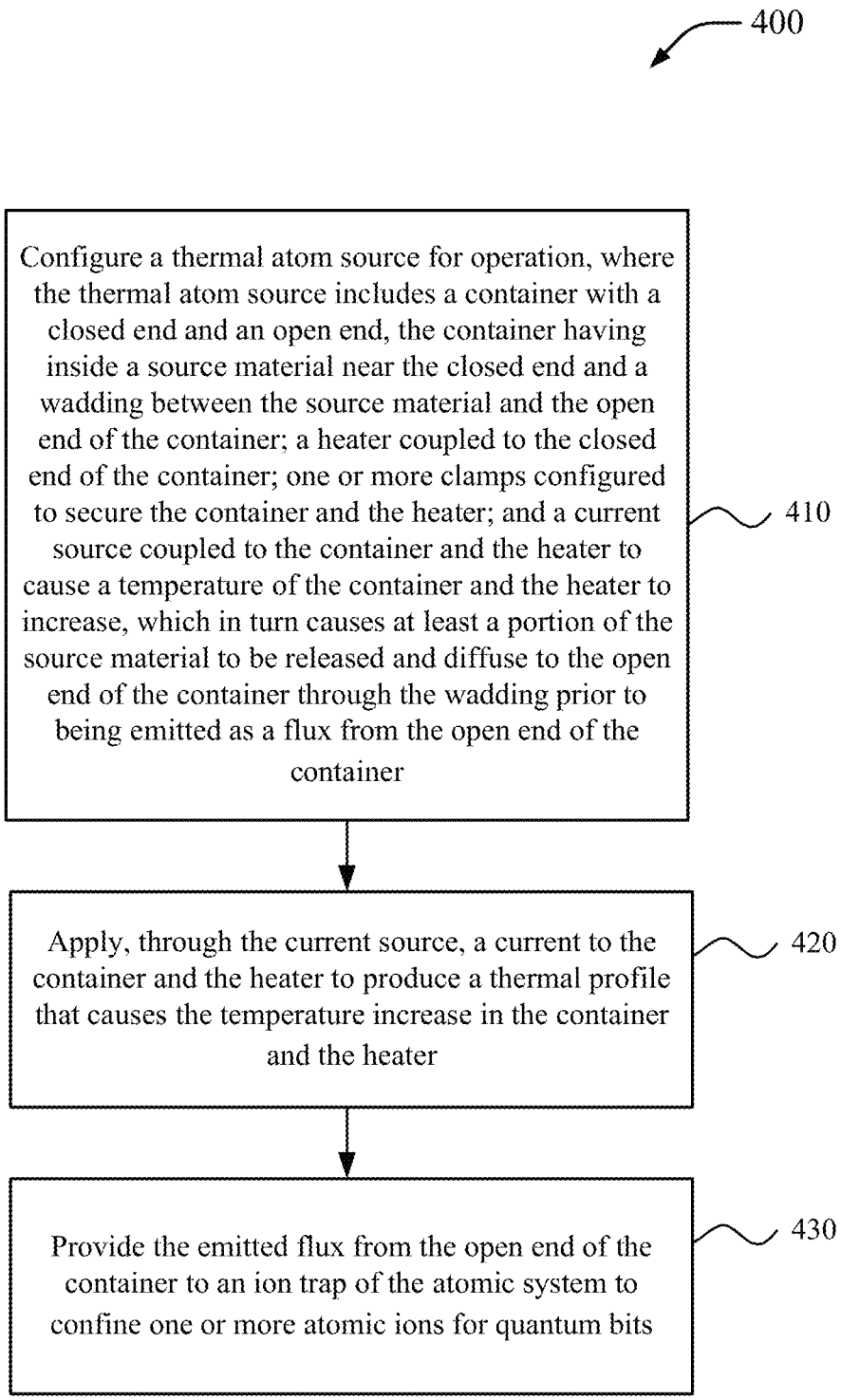
FIG. 4 is a flow diagram that illustrates an example of a method in accordance with aspects of this disclosure.

FIG. 4 is a flow diagram that illustrates an example of a method 400 for using a thermal atom source in a QIP system (e.g., the QIP system 205) in accordance with aspects of this disclosure. In an aspect, the method 400 may be performed as part of an atomic systems or a computer system such as the computer system 500 described below. Similarly, the functions of the method 400 may be performed by one or more components of a QIP system such as the QIP system 205 and its components, where the QIP system can include an ion trap. For example, the method may be performed in connection with the thermal atom source 265 and/or other components configured to operate, control, interact, and/or configure the thermal atom source 265.

At 410, the method 400 includes configuring the thermal atom source for operation, where the thermal atom source includes a container with a closed end and an open end, the container having inside a source material near the closed end and a wadding between the source material and the open end of the container, a heater coupled to the closed end of the container, one or more clamps configured to secure the container and the heater, and a current source coupled to the container and the heater to cause a temperature of the container and the heater to increase, which in turn causes at least a portion of the source material to be released and diffuse to the open end of the container through the wadding prior to being emitted as a flux from the open end of the container.

At 420, the method 400 includes applying, through the current source, a current to the container and the heater to produce a thermal profile that causes the temperature increase in the container and the heater.

In an aspect of the method 400, applying, through the current source, the current to the container and the heater to produce the thermal profile that causes the temperature increase in the container and the heater includes applying the current through the one or more clamps.

At 430, the method 400 includes providing the emitted flux from the open end of the container to an ion trap of the QIP system to create a single trapped ion as a single quantum bit or an ion crystal having multiple atomic ions for quantum bits. That is, by providing the emitted flux from the open end of the container to an ion trap of the QIP system, a single trapped ion can be created as a single quantum bit or an ion crystal having multiple atomic ions for quantum bits can be created.

In an aspect of the method 400, the thermal atom source further includes one or more additional heaters along a length of the container, and controlling the thermal profile at least along the length of the container by controlling the one or more additional heaters.

In another aspect of the method 400, the thermal atom source further includes one or more thermocouples positioned in different places along the container, and the method 400 may further include monitoring temperatures of the container in those places to control the thermal profile.

Figure 5:
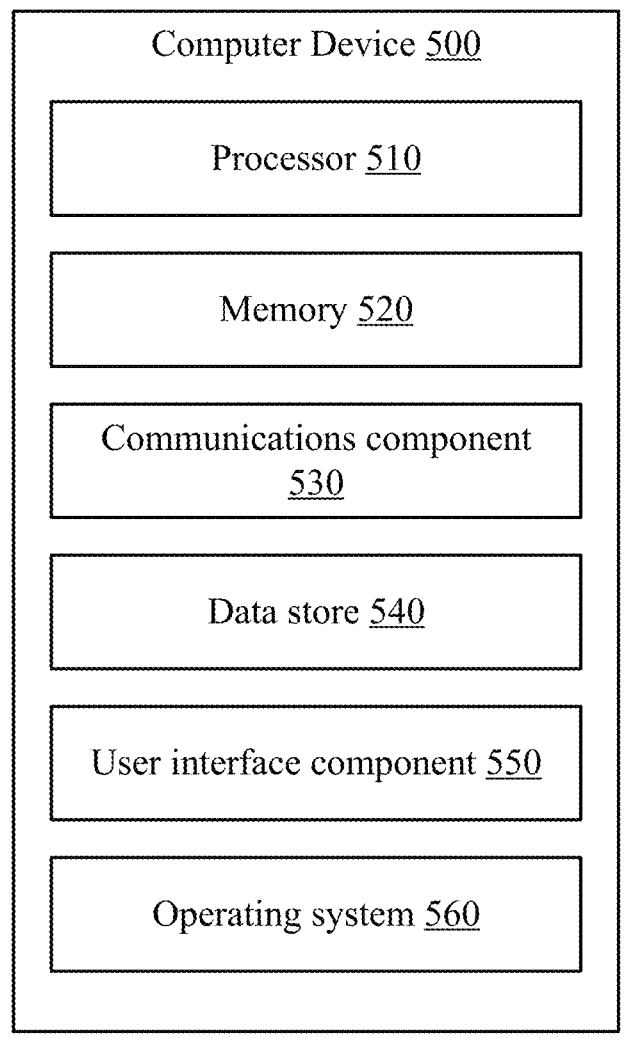
FIG. 5 is a diagram that illustrates an example of a computer device in accordance with aspects of this disclosure.

Referring now to FIG. 5, illustrated is an example computer device 500 in accordance with aspects of the disclosure. The computer device 500 can represent a single computing device, multiple computing devices, or a distributed computing system, for example. The computer device 500 may be configured as a quantum computer, a classical computer, or a combination of quantum and classical computing functions. For example, the computer device 500 may be used to process information using quantum algorithms based on trapped ion technology and may therefore implement a thermal atom source as described above. As described above, the QIP system 205 may be an example of at least a portion of the computer device 500.

In one example, the computer device 500 may include a processor 510 for carrying out processing functions associated with one or more of the features described herein. The processor 510 may include a single or multiple set of processors or multi-core processors. Moreover, the processor 510 may be implemented as an integrated processing system and/or a distributed processing system. The processor 510 may include a central processing unit (CPU), a quantum processing unit (QPU), a graphics processing unit (GPU), or combination of those types of processors. In one aspect, the processor 510 may refer to a general processor of the computer device 510, which may also include additional processors 510 to perform more specific functions such as control and/or monitoring of a thermal atom source, for example.

In an example, the computer device 500 may include a memory 520 for storing instructions executable by the processor 510 for carrying out the functions described herein. In an implementation, for example, the memory 520 may correspond to a computer-readable storage medium that stores code or instructions to perform one or more of the functions or operations described herein. In one example, the memory 520 may include instructions to perform aspects of a method 400 described below in connection with FIG. 4. Just like the processor 510, the memory 520 may refer to a general memory of the computer device 500, which may also include additional memories 520 to store instructions and/or data for more specific functions such as instructions and/or data for control and/or monitoring of a thermal atom source, for example.

Further, the computer device 500 may include a communications component 530 that provides for establishing and maintaining communications with one or more parties utilizing hardware, software, and services as described herein. The communications component 530 may carry communications between components on the computer device 500, as well as between the computer device 500 and external devices, such as devices located across a communications network and/or devices serially or locally connected to computer device 500. For example, the communications component 500 may include one or more buses, and may further include transmit chain components and receive chain components associated with a transmitter and receiver, respectively, operable for interfacing with external devices.

Additionally, the computer device 500 may include a data store 540, which can be any suitable combination of hardware and/or software, that provides for mass storage of information, databases, and programs employed in connection with implementations described herein. For example, the data store 540 may be a data repository for operating system 560 (e.g., classical OS, or quantum OS). In one implementation, the data store 540 may include the memory 520.

The computer device 500 may also include a user interface component 550 operable to receive inputs from a user of the computer device 500 and further operable to generate outputs for presentation to the user or to provide to a different system (directly or indirectly). The user interface component 550 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 550 may include one or more output devices, including but not limited to a display, a speaker, a haptic feedback mechanism, a printer, any other mechanism capable of presenting an output to a user, or any combination thereof.

In an implementation, the user interface component 550 may transmit and/or receive messages corresponding to the operation of the operating system 560. In addition, the processor 510 may execute the operating system 560 and/or applications or programs, and the memory 520 or the data store 540 may store them.

When the computer device 500 is implemented as part of a cloud-based infrastructure solution, the user interface component 550 may be used to allow a user of the cloud-based infrastructure solution to remotely interact with the computer device 500.

Although the present disclosure has been provided in accordance with the implementations shown, one of ordinary skill in the art will readily recognize that there could be variations to the embodiments and those variations would be within the scope of the present disclosure. Accordingly, many modifications may be made by one of ordinary skill in the art without departing from the scope of the appended claims.

What is claimed is:

1. A thermal atom source for quantum information processing atomic systems, comprising:
   a container with a closed end and an open end, the container having inside a source of solid material of a species of atoms used in a quantum information processing atomic system near the closed end and a wadding positioned between the source of solid material and the open end of the container, the wadding being configured and positioned to prevent the source of solid material or any byproducts of the source of solid material from falling out of the container in certain orientations of the container;
   a heater coupled to the closed end of the container;
   one or more clamps configured to secure the container and the heater; and
   a current source coupled to the container and the heater to cause a temperature of the container and the heater to increase, which in turn causes the source of solid material to sublimate or melt and evaporate to release some of the solid material that then diffuses to the open end of the container through the wadding prior to being emitted as a flux of the species of atoms from the open end of the container for use by the quantum information processing atomic system;

wherein the wadding is made of a sintered metal or a sinter ceramic that provides a circuitous path through which the at least a portion of the source of solid material diffuses.

2. The thermal atom source of claim 1, wherein the container is a cylindrical container.

3. The thermal atom source of claim 1, wherein the heater includes a filament.

4. The thermal atom source of claim 3, wherein the filament has a straight configuration or a shaped configuration.

5. The thermal atom source of claim 4, wherein the shaped configuration is a helical configuration.

6. The thermal atom source of claim 1, wherein the one or more clamps include a first clamp to secure the heater and a second clamp to secure the container.

7. The thermal atom source of claim 1, wherein the current source is coupled to the container and the heater through the one or more clamps.

8. The thermal atom source of claim 1, wherein the source of solid material includes two or more elements or compounds that react or amalgamate when heated by the increased temperature of the container and the heater and coat the wadding.

9. The thermal atom source of claim 1, wherein the one or more clamps are connected by an insulator such that the thermal atom source is configured as a plug-in device.

10. The thermal atom source of claim 1, further comprising one or more thermocouples positioned in different places along the container to monitor temperatures of the container in those places.

11. The thermal atom source of claim 1, wherein the container has a straight configuration, a bent configuration, or a 180-degree configuration.

12. The thermal atom source of claim 1, wherein the heater includes a laser that produces radiation to heat up the source of solid material.

13. The thermal atom source of claim 1, wherein the container and the heater are configured to produce a temperature maximum near a middle of the container, closer to the open end of the container that a location of the wadding or configured to produce a temperature maximum at another desired location on the heater or container.

14. The thermal atom source of claim 1, further comprising one or more additional heaters coupled to an outside portion of the container to produce a controllable thermal profile in the container.

15. The thermal atom source of claim 14, further comprising one or more additional current sources coupled to the container and respective one or more additional heaters.

16. The thermal atom source of claim 1, wherein one or more of a wall thickness, a cross sectional size, length, or material of the container and/or the heater filament are varied along a length of the container to create a thermal profile.

17. The thermal atom source of claim 1, further comprising one or more additional waddings between the source of solid material and the open end of the container, wherein the wadding and the one or more additional waddings are of the same composition and structure, or the wadding is of a different composition and structure as the one or more additional waddings, or the wadding and the one or more additional waddings each has a different composition and structure.

18. The thermal atom source of claim 1, wherein the quantum information processing atomic systems include a quantum information processing (QIP) system, a clock, or a sensor.

19. A method for operating a thermal atom source for a quantum information processing atomic system, comprising:

configuring the thermal atom source for operation, the thermal atom source including:

a container with a closed end and an open end, the container having inside a source of solid material near the closed end and a wadding between the source of solid material and the open end of the container;

a heater coupled to the closed end of the container; one or more clamps configured to secure the container and the heater; and a current source coupled to the container and the heater to cause a temperature of the container and the heater to increase, which in turn causes the source of solid material to sublimate or melt and evaporate to release some of the solid material that then diffuses to the open end of the container through the wadding prior to being emitted as a flux from the open end of the container;

applying, through the current source, a current to the container and the heater to produce a thermal profile that causes the temperature increase in the container and the heater; and providing the emitted flux from the open end of the container to an ion trap of the quantum information processing atomic system to confine one or more atomic ions for quantum bits;

wherein the wadding is made of a sintered metal or a sinter ceramic that provides a circuitous path through which the at least a portion of the source of solid material diffuses.

20. The method of claim 19, wherein applying, through the current source, the current to the container and the heater to produce the thermal profile that causes the temperature increase in the container and the heater includes applying the current through the one or more clamps.

21. The method of claim 19, wherein:

the thermal atom source further includes one or more additional heaters along a length of the container, and controlling the thermal profile at least along the length of the container by controlling the one or more additional heaters.

22. The method of claim 19, wherein: the thermal atom source further includes one or more thermocouples positioned in different places along the container, and the method further includes monitoring temperatures of the container in those places to control the thermal profile.

23. A thermal atom source for quantum information processing atomic systems, comprising:

a container with a closed end and an open end, the container having inside a source of solid material of a species of atoms used in a quantum information processing atomic system near the closed end and a wadding positioned between the source of solid material and the open end of the container, the wadding being configured and positioned to prevent the source of solid material or any byproducts of the source of solid material from falling out of the container in certain orientations of the container;

a heater configured to provide radiation heating and positioned near the container; and one or more clamps configured to secure the container, wherein the radiation heating provided by the heater causes a temperature of the container to increase, which in turn causes the source of solid material to sublimate or melt and evaporate to release some of the solid material that then diffuses to the open end of the container through the wadding prior to being emitted as a flux of the species of atoms from the open end of the container for use by the quantum information processing atomic system;

wherein the wadding is made of a sintered metal or a sinter ceramic that provides a circuitous path through which the at least a portion of the source material diffuses.

24. A thermal atom source for quantum information processing atomic systems, comprising:

a container with a closed end and an open end, the container having inside a source of solid material of a species of atoms used in a quantum information processing atomic system near the closed end and a wadding positioned between the source of solid material and the open end of the container, the wadding being configured and positioned to prevent the source of solid material or any byproducts of the source of solid material from falling out of the container in certain orientations of the container;

a heater coupled to the closed end of the container;

one or more clamps configured to secure the container and the heater; and a current source coupled to the container and the heater to cause a temperature of the container and the heater to increase, which in turn causes the source of solid material to sublimate or melt and evaporate to release some of the solid material that then diffuses to the open end of the container through the wadding prior to being emitted as a flux of the species of atoms from the open end of the container for use by the quantum information processing atomic system;

wherein the wadding is made of platinum such that the flux emitted from the open end of the container is a positive flux.

\* \* \* \* \*